Patented Feb. 16, 1954

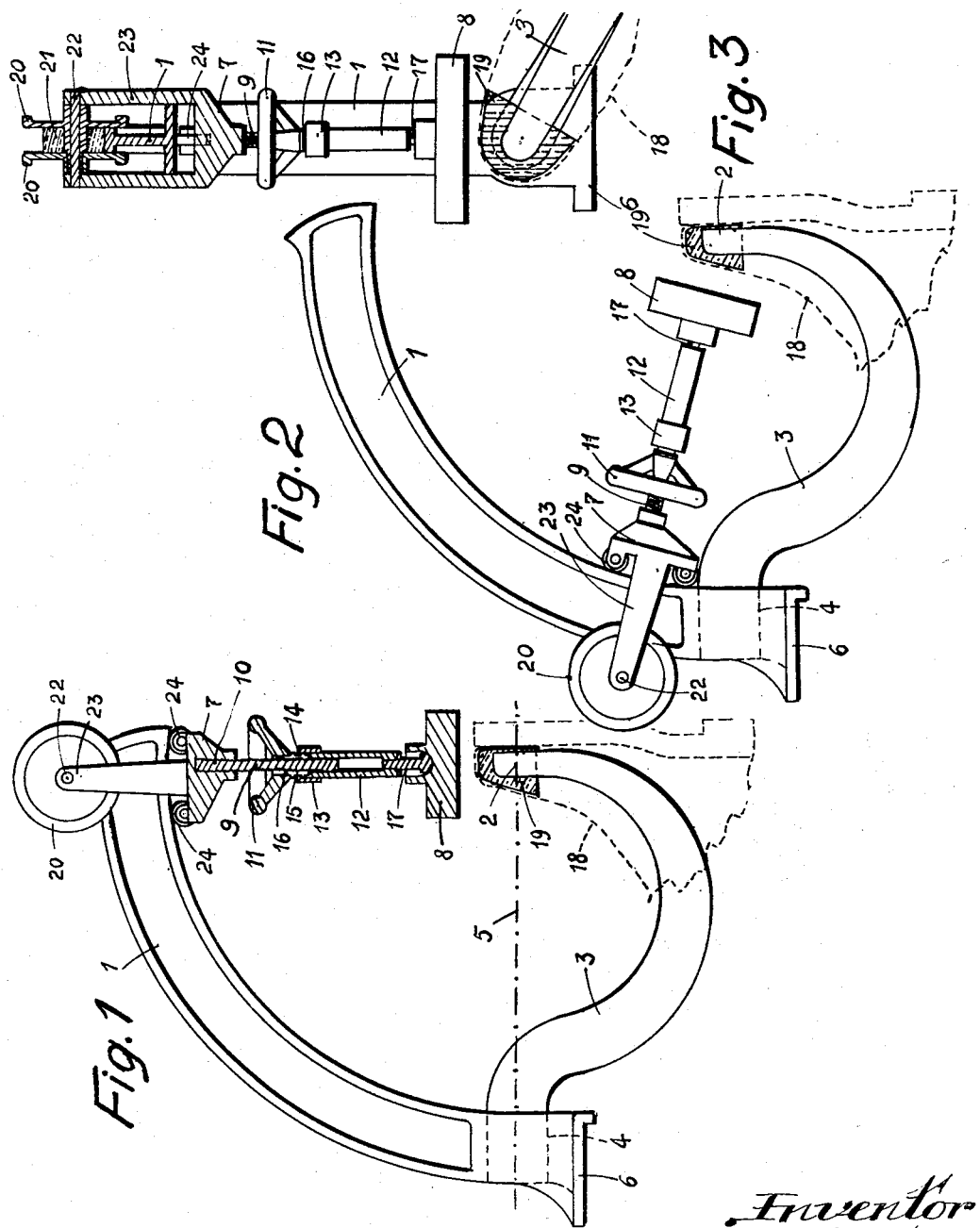

2,668,984

UNITED STATES PATENT OFFICE 2,668,984

VULCANIZING OUTFIT FOR REPAIRING RUBBER ARTICLES

René Clement Joseph Gaschi, Alencon, France

Application October 31, 1951, Serial No. 254,029
Claims priority, application France
December 21, 1950

2 Claims. (Cl. 18—18)

The present invention relates to vulcanizing outfits in general and more particularly to an improved vulcanizing outfit for repairing rubber boots and similar articles.

It is practially impossible to repair vamp and side portions of rubber boots, and other rubber articles of intricate shape, with the known means, because the vamp of a boot, for instance, is formed with a great number of curvilinear portions the accessibility of which is inconsistent with efficient and lasting repairs.

It is the object of the present invention to provide a fully adjustable vulcanizing outfit whereby the above inconveniences are avoided and efficient repairs can be carried out successfully on rubber articles regardless of the place in which the repair is to be effected.

The essential feature that characterises the outfit according to the present invention is that the heating device thereof together with the clamping means co-operating therewith are movable along a swan-neck support of quarter-circle shape the center of which is adjacent to the outer end, and coincident with the fulcrum axis, of a supporting member consisting of a straight or bent swivel arm having its opposite or inner end pivotally mounted for movement about this axis in a bearing provided near the bottom end of the aforesaid swan-neck support. By adequately combining the movements of these members and of the article to be repaired the surface where the vulcanisation is to be made may be caused to register with the heating device and in all cases positioned at substantially right angles to the axis along which the vulcanizing pressure will be applied through said heating device.

According to an additional feature of the present invention the clamping and heating unit will remain in its angular position when it is released along the swan-neck support, without resorting to any screw or clamping device, due to a permanent braking effect applied to this assembly and resulting for instance from the resilient action of a rubber roller pressed against the outer side of the swan-neck support and mounted on a carriage supporting in turn the heating device with its cooperative clamping system.

The accompanying drawing forming part of this specification illustrates diagrammatically by way of example one possible embodiment of a vulcanizing outfit according to the invention, intended more specifically for repairing boots supported by a curved arm. In the drawing:

Figure 1 is an elevational and part-sectional side view of the vulcanizing outfit wherein the clamping and heating unit on the one hand and the curved arm on the other hand are shown in their vertical positions.

Figure 2 is a similar yet only elevational side view showing the clamping and heating unit in its lowermost, almost horizontal position.

Figure 3 is a front elevational view of the device showing in axial section the carriage whereby the clamping and heating unit is mounted on the swan-neck support, and shown in the same angular position as in Figure 1, the curved arm being displaced by about 60° to the right.

Referring to the drawing, the swan-neck support 1 of the outfit has a quarter-circle shape the geometrical center of which is a fixed point 2 adjacent to the outer end of a swivel arm 3 having its opposite or inner end pivotally mounted in a bearing 4 formed near the bottom end of the swan-neck support 1. Thus, the swivel arm 3 is angularly movable about an horizontal axis 5 passing through the aforesaid fixed point 2. This fixed point or center 2 remains unchanged irrespective of the angular position of the swivel arm 3. In the example illustrated the swan-neck support 1 has an inverted-T cross section and is formed at its bottom end with a fixing-plate extension 6 for anchoring the vulcanizing outfit to any suitable base plate or bench.

Above the bearing portion 4 of the swan-neck support 1 the latter has mounted thereon for motion therealong a carriage 7 supporting the clamping and heating unit of the outfit. The heating device will not be described herein as it may consist of any convenient and known system, usually housed in an interchangeable casing 8 which may have any desired or suitable shape. The clamping device proper consists of a screw rod 9 having its upper end 10 rigidly embedded in the carriage 7 (see Figure 1), a control handwheel 11, an internally-screwed hub 16 fast with the handwheel 11 and formed with a peripheral groove 15, a ring member 13 made of two halves and formed with an upper internal flange 14 engaging the peripheral groove 15, a tubular member 12 having its upper end axially fixed with the ring member 13 and its lower end fast with a round-headed push member 17 through which the desired pressure is exerted on the casing 8. From this arrangement it is apparent that the required pressure is obtained by rotating the handwheel 11 in the suitable direction and that the casing 8 is lifted and released from the workpiece by rotating the same handwheel in the opposite direction.

In case the repair is to be made at the toe end of the boot the outfit is set in the position of Figure 1. The boot 18 shown in dotted lines is first threaded on the curved arm 3 the tip of which has been capped beforehand with a pad 19 of rubber or other suitable material having substantially the outer contour of that inner portion of the boot.

If on the contrary the part to be repaired is the vamp of the boot the carriage 7 will be moved to the suitable angular position by actuating the carriage-supporting wheel comprising a pair of disks 20 having mounted therebetween a roller 21 of rubber or any other suitable material which bears on the outer side of the swan-neck support 1. The wheel 20, 21 is rotatably mounted on a shaft 22 carrying a pair of side prongs 23 extending radially from the carriage 7 as shown. The latter carries a set of rollers 24 running along the inner side of the swan-neck support 1 and constantly urged against the latter by the resilient reaction of the elastic roller 21 which is slightly pressed against the support on assembling the outfit.

It will be easily understood that by rotating the wheel 20, 21 the complete clamping and heating unit is moved towards one or the other end of the support 1 whereby altering the radial position of this unit and that on releasing this wheel 20, 21 the same assembly is held in the position it occupies at that moment without it being necessary to clamp or screw in any fastening member.

If, on the other hand, the swivel arm 3 is moved angularly about its axis 5 to the left or to the right by the required amount any repair can be accomplished by presenting it at right angles with the axis along which the heating casing is pressed, irrespective of the position of the repair on the boot, the latter being threaded more or less on the rubber pad 19 carried by the swivel arm 3.

Of course the specific embodiment illustrated in the drawing and described hereinabove is given solely by way of example, it being understood that many modifications may be brought thereto without departing from the spirit and scope of the invention.

I claim:

1. An adjustable vulcanizing apparatus for repairing rubber articles such as boots and the like, comprising an elongated curved support having a quarter circle configuration and opposed curved sides thereof forming trackways, a resilient roller movably mounted on one of said trackways, rollers movably mounted on the opposite of said trackways, means connecting said rollers on both trackways and maintaining said resilient roller in frictional engagement with its respective trackway, heating means, clamping means connected to said roller connecting means and said heating means for pressing the same against the article being repaired, an arm pivotally connected to said support for being turned around an axis extending on a radius of said support with an end of said arm being positioned substantially at the center of the quarter circle formed by said support.

2. An adjustable vulcanizing apparatus for repairing rubber articles such as boots and the like comprising an elongated longitudinally curved support having a quarter circle configuration, clamping means slidably and frictionally connected to said support while extending radially therefrom and being longitudinally extensible, heating means carried by said clamping means, a circular bearing opening formed in one end of said support with the axis thereof extending radially of said support, an arm for supporting the article to be repaired having a straight end portion of circular cross section rotatably positioned in said support bearing opening, the remainder of said arm being curved longitudinally with the free end thereof positioned substantially at the center of the quarter circle formed by said support and the free end portion of said arm extending towards the other end of said support.

RENÉ CLEMENT JOSEPH GASCHI.

References Cited in the file of this patent

UNITED STATES PATENTS

| Number | Name | Date |
|---|---|---|
| 1,234,431 | White | July 24, 1917 |
| 2,347,952 | James | May 2, 1944 |

FOREIGN PATENTS

| Number | Country | Date |
|---|---|---|
| 395,035 | France | Feb. 8, 1909 |
| 468,608 | Germany | Nov. 16, 1928 |
| 957,574 | France | Feb. 21, 1950 |